Dec. 28, 1965     W. J. SKINNER ETAL     3,225,614
SHEAVE
Filed June 24, 1963     4 Sheets-Sheet 1

INVENTORS
WILLIAM J. SKINNER
EARL D. SCOTT
BY
M. A. Hobbs
ATTORNEY

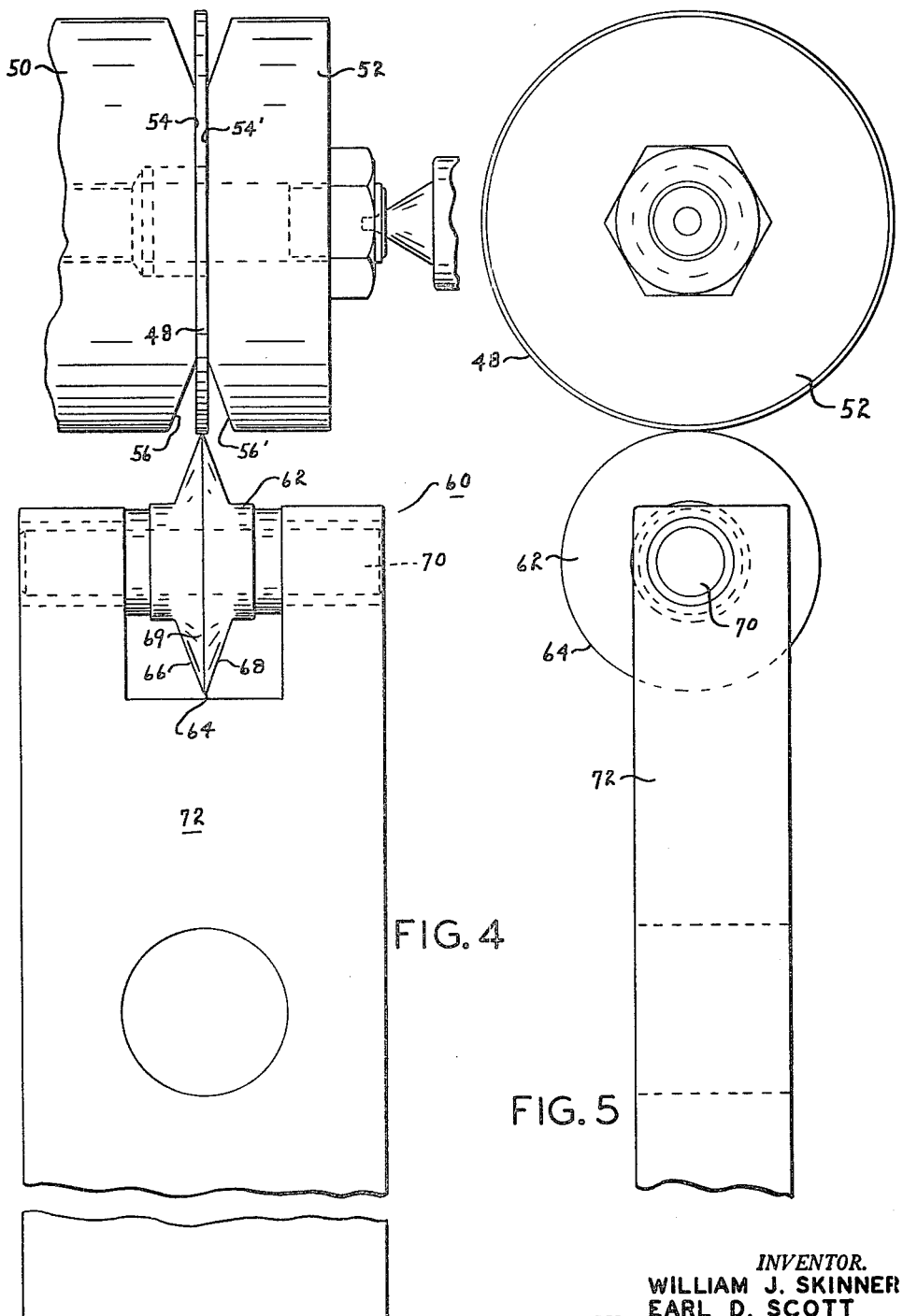

Dec. 28, 1965 W. J. SKINNER ETAL 3,225,614
SHEAVE
Filed June 24, 1963
4 Sheets-Sheet 3

*INVENTOR.*
WILLIAM J. SKINNER
EARL D. SCOTT
BY *M. A. Hobbs*

ATTORNEY

INVENTOR.
WILLIAM J. SKINNER
EARL D. SCOTT
BY Hobbs & Easton
ATTORNEYS

United States Patent Office 3,225,614
Patented Dec. 28, 1965

3,225,614
SHEAVE
William J. Skinner and Earl D. Scott, Walkerton, Ind., assignors, by mesne assignments, to Small Business Administration, Indianapolis, Ind., an agency of the United States
Filed June 24, 1963, Ser. No. 290,147
6 Claims. (Cl. 74—230.01)

The present invention relates to metal fabrication and more particularly to a sheave or pulley primarily intended for use wth V-belts. This applicaton is a continuation-in-part of our copending application Serial No. 97,799, filed March 23, 1961, now abandoned.

In the fabrication of grooved metal pulleys, sheaves and the like, the usual practices involve casting, stamping and/or machining operations or a combination of two or more of these operations. The cast sheaves are formed as a solid body with an integral hub and a peripheral groove, and are then machined by drilling and turning to remove flashings and spurs and to true the bodies circumferentially to the desired size. This fabrication operation requires several independent steps, usually necessitating separate handling of the partially completed units between each successive step, thus resulting in excess costs in labor and equipment. In some instances, the sheaves are machined from solid bar or plate stock, including machining the hub and groove and the external side contour to the required dimensions; however, this method is expensive and is not extensively used in the field, requiring relatively low cost, competitive units for home appliances, such as washing machines, laundering and drying equipment. A method extensively used at the present time involves a stamping operation in which two lateral halves of the sheave are made separately and then spot welded or riveted together to form the groove and possibly the hub; the latter, however, is often formed separately and secured to the center of the two assembled lateral sides by welding, riveting or metal flanging operation. This third type of fabricating operation uses several inexpensive metal forming and joining operations, but the parts formed by each step are normally handled individually between steps and frequently do not have the required accuracy for high speed, heavy duty, and service-free operation. It is therefore one of the principal objects of the present invention to provide for forming a sheave, pulley or article of similar structure, in which the flange and body thereof are formed as a single piece initially, starting with a flat disc of metal sheet or plate material, and in which the flanges forming the groove are equal in total thickness to the original thickness of the sheet or plate material.

Still another object of the invention is to provide a sheave, pulley and similar flanged and grooved devices of a one piece metal body and flange construction with the flanges being equal in thickness to one half the body thickness and with the internal faces of the flanges being worked by the forming operation sufficiently to provide a hardened, wear resistant, burnished surface.

A further object is to provide a sheave having a disc-shaped body portion with a center opening and outwardly extending flanges forming a groove for a V-belt or the like and having a hub formed as a separated piece extending into the opening and being rigidly secured to the body portion to form a rigid permanent structure therewith.

Another object of the invention is to provide high strength, non-frangible sheaves for heavy-duty, high speed application which can be produced under conditions and with materials which render them competitive in price with conventional inferior sheaves and which are more reliable and durable and require less service than conventional sheaves.

Additional objects and advantages of the invention will become apparent from the following description and accompanying drawings, wherein:

FIGURE 4 is a top plan view of the principal mechanism employed in producing the sheave of the preceding figures, illustrating in part the manner in which the fabricating method is performed;

FIGURE 5 is a side elevational view of the mechanism shown in FIGURE 4;

Figure 1:
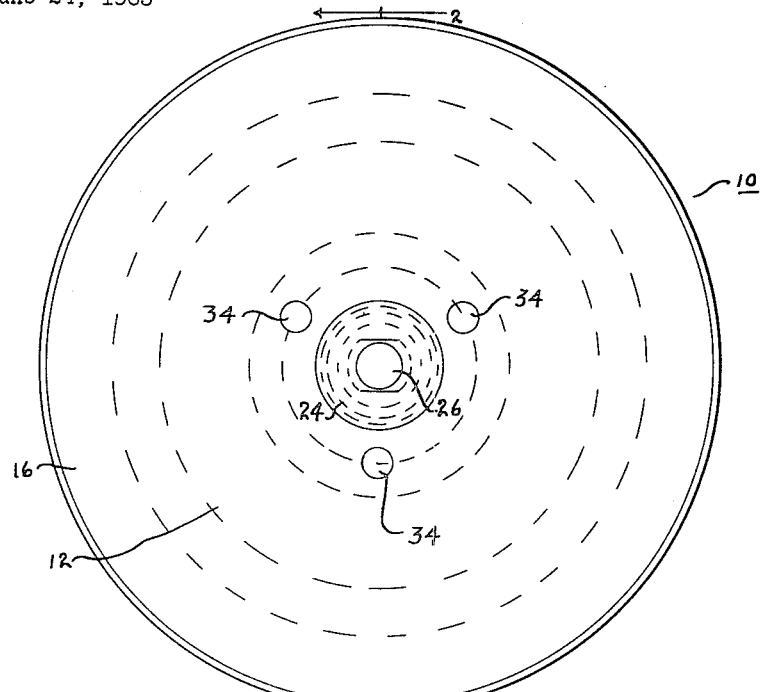
FIGURE 1 is a side elevational view of a sheave embodying our invention.
Figure 2:
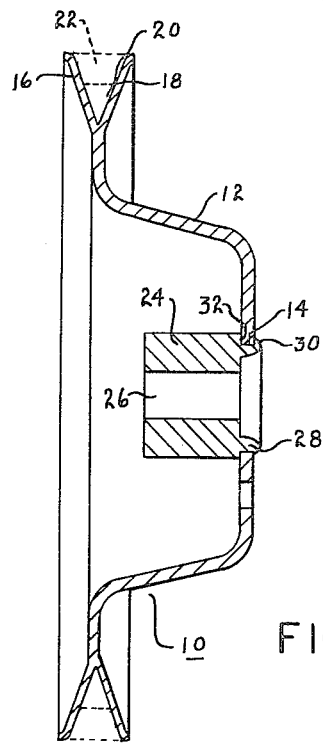
FIGURE 2 is a vertical cross sectional view of the sheave shown in FIGURE 1, taken on line 2—2 of the latter figure.
Figure 3:
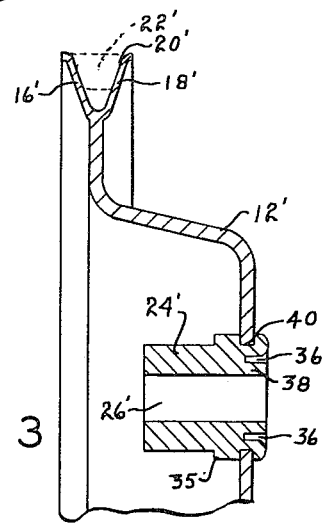
FIGURE 3 is a vertical cross sectional view of a modified form of the sheave shown in the preceding figures, the section being taken on the same line as the section of FIGURE 2.
Figure 8:
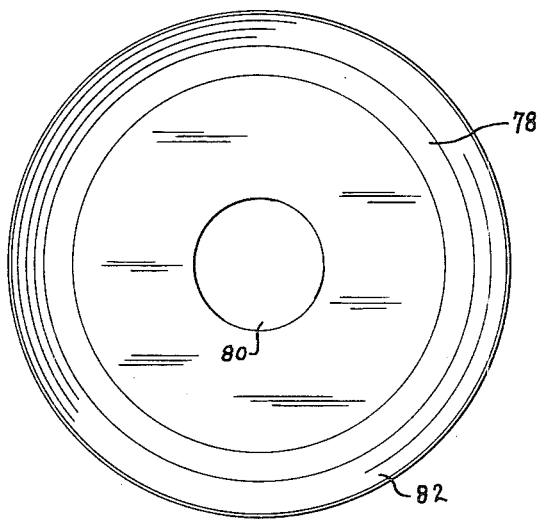
FIGURE 8 is a side elevational view of a modified form of sheave formed by the present method.
Figure 9:
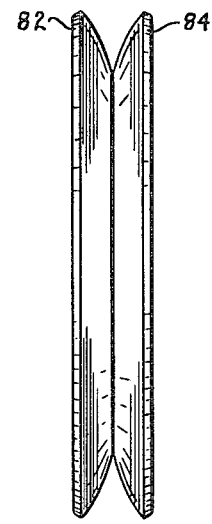
FIGURE 9 is an edge elevational view of the sheave shown in FIGURE 8.
Figure 12:
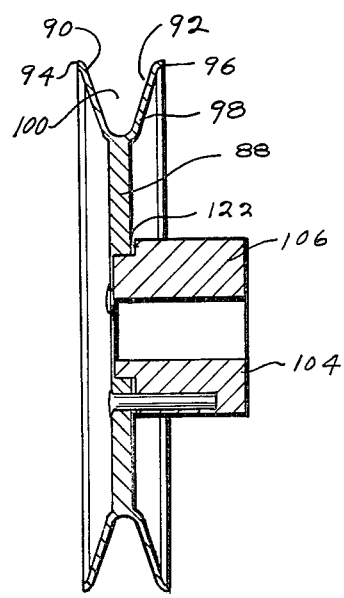
FIGURE 12 is a cross sectional view of the sheave shown in the last two preceding figures, the section being taken on line 12—12 of FIGURE 10.

Referring more specifically to the drawings, the sheave 10 shown in FIGURES 1 and 2 consists of a cup-shaped body portion 12 having a center hole 14 and integral flanges 16 and 18 forming an annular peripheral groove 20 for receiving a V-belt 22, shown in broken lines, cable, rope or the like. A hub 24 having a bore 26 for receiving a shaft (not shown) of a motor for driving the sheave or a power input shaft of some type of machine, mechanism or device (not shown), is secured to the center of body 12 by extending a reduced diameter portion 28 through the hole and swaging the annular end portion 30 of the hub firmly against the margin of the body defining the hole. The swaging operation clamps the adjacent body portion against an annular shoulder 32 and forms a groove which retains the body and hub permanently and rigidly together. While the body portion 12 of the embodiment of the invention illustrated in FIGURES 1, 2 and 3 is cup-shaped, the other features just described are equally applicable to a strictly disc-shaped body portion as shown in FIGURES 8 and 9 or body portions of other desired shapes. In order to retain the blank from which the sheave is fabricated rigidly in the fabricating machine during the forming operation, a plurality of holes 34 equally spaced from the center and from each other are preferably provided in the blank.

The difference between the sheaves shown in FIGURES 2 and 3 is primarily in the hub 24′ and in the shape of the flanges 16 and 18 of FIGURE 2 and the flanges 16′ and 18′ of FIGURE 3, and the respective grooves 20 and 20′ formed thereby. In the former the flanges are substantially straight and are joined together at their inner edges to form an acute angle, whereas the flanges of the latter are curved laterally inwardly at their inner edges to form a smooth rounded bottom in groove 20'. The hub structure in FIGURE 3 is different from the hub structure in FIGURE 2 particularly with respect to the portion forming the means securing the hub to body 12'. The latter hub is provided with an annular rib 35 against which the inner side of body 12', seats and an annular groove 36 separates the flange 38 forming groove 40 from the center of the hub to facilitate an effective joint during the swaging operation.

One method of forming the present one-piece body and flange construction shown in FIGURES 1, 2 and 3 is illustrated in FIGURES 4 through 7 and consists basically in parting the marginal edge of a disc-shaped blank or other shaped blanks having an annular flange extending radially outwardly and concentrically disposed with the axis of the blanks. The complete method includes first forming the blank 48 from which the sheave is made by stamping or otherwise forming a disc or cup-shaped blank from metal sheet or plate material, and preferably drilling or stamping holes 34 therein. The blank which is preferably not heated is placed in a lathe, for example, and clamped firmly therein between head and tail members 50 and 52 concentric with the axis of rotation of the two members, and thence rotated at a predetermined speed. Members 50 and 52 are steel bodies having flat radial and matching surfaces 54 and 54' for clamping the blank therebetween, and preferably having a plurality of projections for seating in holes 34, the radial surfaces terminating in annular angular surfaces 56 and 56' which form the die surfaces corresponding to the desired final angle of flanges 16 and 18 of the sheave. As the blank is rotated, parting tool 60, consisting of a roller 62 having an annular cutting or parting edge 64 and tapered sides 66 and 68 corresponding to angular surfaces 56 and 56', is fed at a predetermined rate into the peripheral edge of blank 48, causing the lateral sides of the blank to separate and, as tool 60 reaches the end of its travel, to form flanges 16 and 18 with the two flanges pressed firmly against surfaces 56 and 56'. At the end of travel, tool 60 is rotated or spun momentarily against the internal surfaces of the two flanges to superficially work the metal forming the flanges and burnish and polish the surfaces forming groove 20 to provide a hardened wear-resistant surface on the flanges. The foregoing operation is strictly a parting operation in which the metal forming the margin of the blank is separated and pressed laterally against members 56 and 56' without reducing the total thickness of the two flanges to less than the original thickness of the blank margin.

Figure 6:
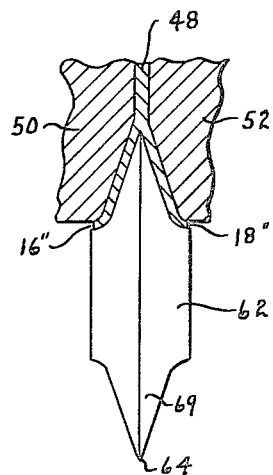
FIGURE 6 is a top plan view of one type of tool used in performing the method, the figure including a fragmentary view of the sheave being formed thereby to illustrate one step of the fabricating operation.

As seen in FIGURES 4 through 6, roller 62 is provided with a parting rib 69 of triangular cross sectional shape with substantially straight lateral sides so that a minimum amount of working or distortion occurs in the metal in the flanges during the operation. The roller is mounted on a pin 70 and rotates freely thereon in response to the applied rotative force of the blank, the pin being rigidly supported by base 72 which is the support for the roller, and is fed inwardly toward the blank and withdrawn by any suitable conventional or standard tool feeding mechanism manually or automatically controlled. The tool at the base of rib 69 and the marginal edges of surfaces 56 and 56' may be correspondingly rounded to form a bead or laterally turned edge 16" and 18" on the periphery of flanges 16 and 18 in the manner illustrated in FIGURE 6. Various modifications in the tool can be made and the roller can be revolved rapidly around the blank while the latter is held stationary or rotated slowly in the opposite direction.

Figure 7:
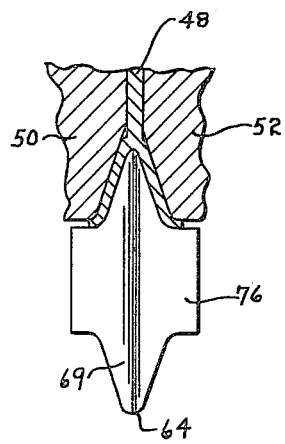
FIGURE 7 is a top plan view of a modified form of tool used in performing the method and of a portion of the sheave being formed thereby to illustrate the operation.

FIGURE 7 illustrates a further step, but an optional step, in which the parting edge 64 of rib 69 of tool 76 is rounded to form the type of groove 20 of FIGURE 3. A greater amount of metal working and deformation is likely to occur in the operation when tool 76 is used, and some thinning of the flanges at the external margins and thickening at their internal margins will normally occur. Tool 76 may be used after the sheave has been initially formed by tool 62 if desired.

In one example, a disc-shaped blank of substantially the same size and shape as the sheave 78 shown in FIGURE 8 is stamped from twelve gauge steel sheet material and perforated to form hole 80, and is then clamped between head and tail members 50 and 52 and rotated at a peripheral speed of between 500 and 800 feet per minute. Roller 62 is advanced and edge 64 forced inwardly in to the edge of the blank as the roller is rotated by contact at the rate of .010 inch per revolution of the blank with the edge of the blank. As the roller is advanced the disc-shaped blank is parted edge-wise, forming two flanges 82 and 84 of equal thickness and of a total thicknes equal to the original thickness of the blank. The particular curvature of the side walls of the flanges is determined by the configuration of side walls 66 and 68 of the roller and of the radial surfaces 56 and 56' of head and tail members 50 and 52; however, these surfaces should be substantially straight.

Figure 10:
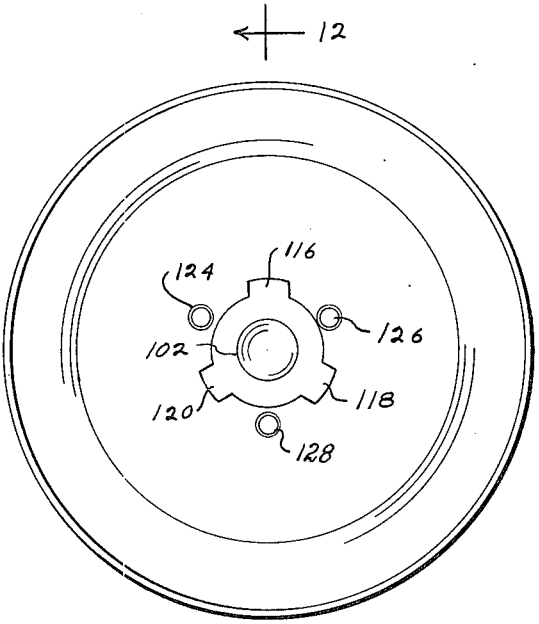
FIGURE 10 is a side elevational view of a further modified form of the present sheave.
Figure 11:
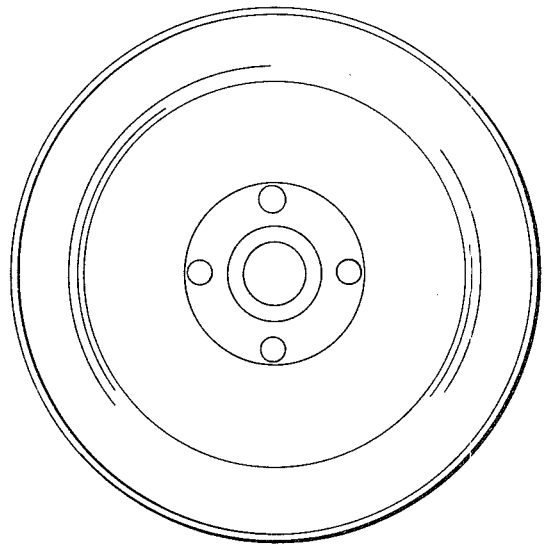
FIGURE 11 is an elevational view of the opposite side of the sheave shown in FIGURE 10.
Figure 13:
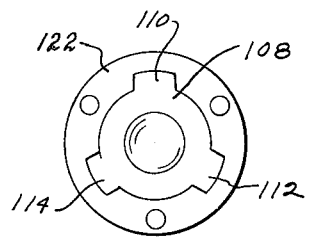
FIGURE 13 is an end elevational view of the hub forming a part of the sheave of the modified form.

The modified form of the present sheave embodying the present invention is illustrated in FIGURES 10 through 13. In this modification, the principal portion of the sheave is constructed from a flat, disc-shaped blank into the form of a disc-shaped body portion 88 with outwardly extending flanges 90 and 92 joined integrally to disc-shaped body portion 88 at the periphery thereof. The outer edges of the flanges 94 and 96 are preferably turned laterally and the inner edges of the flanges are spread to provide a relatively broad bottom 98 in groove 100. In forming the body portion and flanges, a disc-shaped member is blanked from sheet or plate steel, depending upon the thickness required, and a center opening 102 of the configuration illustrated in FIGURE 10 is formed therein. The edge is then split, forming flanges 90 and 92 and groove 100, using the process described previously herein or using the method disclosed and claimed in our copending application Serial No. 250,629, filed on January 10, 1963. After the body 88, with flanges 90 and 92 formed thereon and opening 102 formed therein has been completed, a hub 104 is secured to body 88 in hole 102. The hub consists of a cylindrical member 106 with protrusion 108 on one end thereof having lugs 110, 112 and 114 extending radially outwardly for seating in slots 116, 118 and 120, respectively, of opening 102. Protrusion 108 is inserted in hole 102 with lugs 110, 112 and 114 seated in slots 116, 118 and 120 with the adjacent face of body 88 seated firmly against shoulder 122 on the inner side of member 106.

After protrusion 108 has been inserted in hole 102 in the foregoing manner, the hub is secured rigidly and permanently in place by pins 126, 126 and 128 extending through holes in body 88 into corresponding holes in member 106. While the pins are shown extending a portion of the way axially through body 106 and being held therein by merely a snug fit, the pins may extend fully through member 106 and the pins riveted or otherwise secured to both the body 88 and member 106 to form a further reinforced connection between the body and the hub. It is apparent that this construction forms a rigid structure which will carry any load placed on the pulley, and which will hold the hub and body portion of the sheave firmly together throughout the life thereof. The foregoing construction avoids any difficult operations of reforming the internal portion of the disc-shaped blank to produce a hub and provides a positive connection between the hub and the body portion.

In performing the method, it may be desirable to feed the parting roller into the blank at a relatively high rate of speed in order to cause the parted metal flanges to remain substantially straight throughout the operation rather than roll or curve laterally to any appreciable degree. The method is a cold metal operation and can be performed on standard commercial steel, aluminum and other metals, the blanks thereof preferably being stamped or otherwise severed from sheet or plate material. The method is particularly adapted to the manufacture of V-belt sheaves and can be performed with one or a plurality of form rollers. Rollers for forming radial grooves or other markings of a suitable pattern can be applied to inner surfaces of the flanges for the purpose of providing a no-slip surface for belts operating under oily, wet or other adverse conditions and providing better traction with less belt tension.

While several variations of the present sheave have been described in detail herein, changes and further modifications may be made without departing from the scope of the invention.

We claim:

1. A sheave comprising a disc-shaped body having a generally round center opening with three equally spaced radially extending slots of generally rectangular shape in the portion of said body defining said opening, straight annular flanges joined integrally to the periphery of said body and extending outwardly therefrom at equilateral angles, the flanges being of equal thickness and having a total thickness equal to the thickness of said body, each flange having axially extending beads on the external edge thereof and being connected to one another by a relatively broad curved structure, a hub including a cylindrical member having an axial bore therethrough and a protrusion on one end of said member of the same configuration as said opening and with lugs thereon interlocking with the slots, a radially extending shoulder between said protrusion and the periphery of said member for receiving a side of said body, and a plurality of pins extending axially through said body in the space between said slots and seating in holes in said hub member, each of said pins being spaced radially outwardly from said protrusion.

2. A sheave comprising a disc-shaped body having a generally round center opening with a plurality of spaced radially extending slots in the portion of said body defining said opening, annular flanges joined integrally to the periphery of said body and extending outwardly therefrom at equilateral angles and being connected to one another by a relatively broad curved structure, a hub including a cylindrical member having an axial bore therethrough and a protrusion on one end of said member of the same configuration as said opening and with lugs thereon interlocking with the slots, a radially extending shoulder between said protrusion and the periphery of said member for receiving a side of said body, and a plurality of pin-like members extending axially through said body and being joined to said hub member at said shoulder, each of said pin-like members being spaced radially outwardly from said protrusion.

3. A sheave or pulley, comprising a disc-shaped body, a groove in the periphery having a generally round center opening with three equally spaced radially extending slots of generally rectangular shape in the portion of said body defining said opening, a hub including a cylindrical member having an axial bore therethrough and a protrusion on one end of said member of the same configuration as said opening and with lugs thereon interlocking with the slots, a radially extending shoulder between said protrusion and the periphery of said member for receiving a side of said body, and a plurality of pins extending axially through said body in the space between said slots and seating in holes in said hub member, each of said pins being spaced radially outwardly from said protrusion.

4. A sheave or pulley, comprising a disc-shaped body, a groove in the periphery having a center opening, a plurality of spaced radially extending slots in the portion of said body defining said opening, a hub including a member having an axial bore therethrough and a protrusion on one end of said member of the same configuration as said opening and with lugs thereon interlocking with the slots, and a plurality of pin-like members extending axially through said body in the space between said slots and being joined to said hub member at said shoulder.

5. In a sheave, pulley or the like: a disc-shaped body having a center opening, a plurality of spaced radially extending slots in the portion of said body defining said opening, a hub including a member having an axial bore therethrough and a protrusion on one end of said member of the same configuration as said opening and with lugs thereon interlocking with the slots, and a plurality of pin-like members extending axially through said body and being joined to said hub member at said shoulder, each of said pin-like members being spaced radially outwardly from said protrusion.

6. A sheave comprising a disc-shaped body having a center opening, a plurality of spaced radially extending slots in the portion of said body defining said opening, annular flanges joined integrally to the periphery of said body and extending outwardly therefrom at equilateral angles, a hub including a member having an axial bore therethrough and a protrusion on one end of said member of the same configuration as said opening and with lugs thereon interlocking with the slots, and means extending through holes in said body for securing said protrusion in said opening.

References Cited by the Examiner

UNITED STATES PATENTS

| | | | |
|---|---|---|---|
| 1,494,410 | 5/1924 | Bidle | 29—159 |
| 2,895,364 | 7/1959 | Heinz | 287—53 X |
| 3,069,918 | 12/1962 | Schultz | 74—230.4 |
| 3,080,644 | 3/1963 | Previte et al. | 29—159 |
| 3,087,531 | 4/1963 | Pacak | 29—159 X |
| 3,101,625 | 8/1963 | Horvath | 74—722 X |

DON A. WAITE, *Primary Examiner.*